Nov. 19, 1957 E. A. VERRINDER ET AL 2,813,639
BOX SEGREGATOR
Original Filed Dec. 17, 1949 7 Sheets-Sheet 1
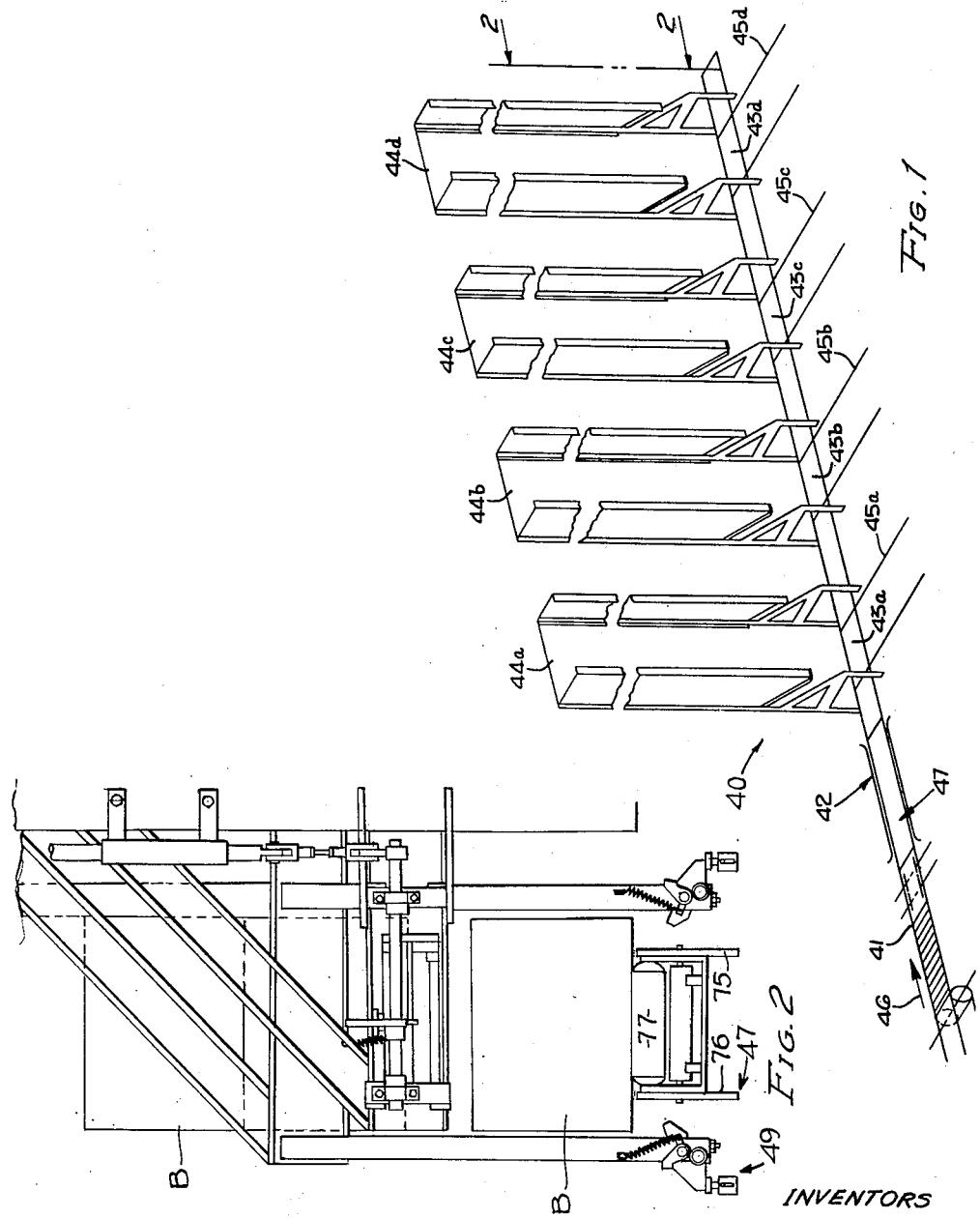
INVENTORS
ERNEST A. VERRINDER
EARLE J. MC GRATH
BY
Hans G. Hoffmeister
ATTORNEY

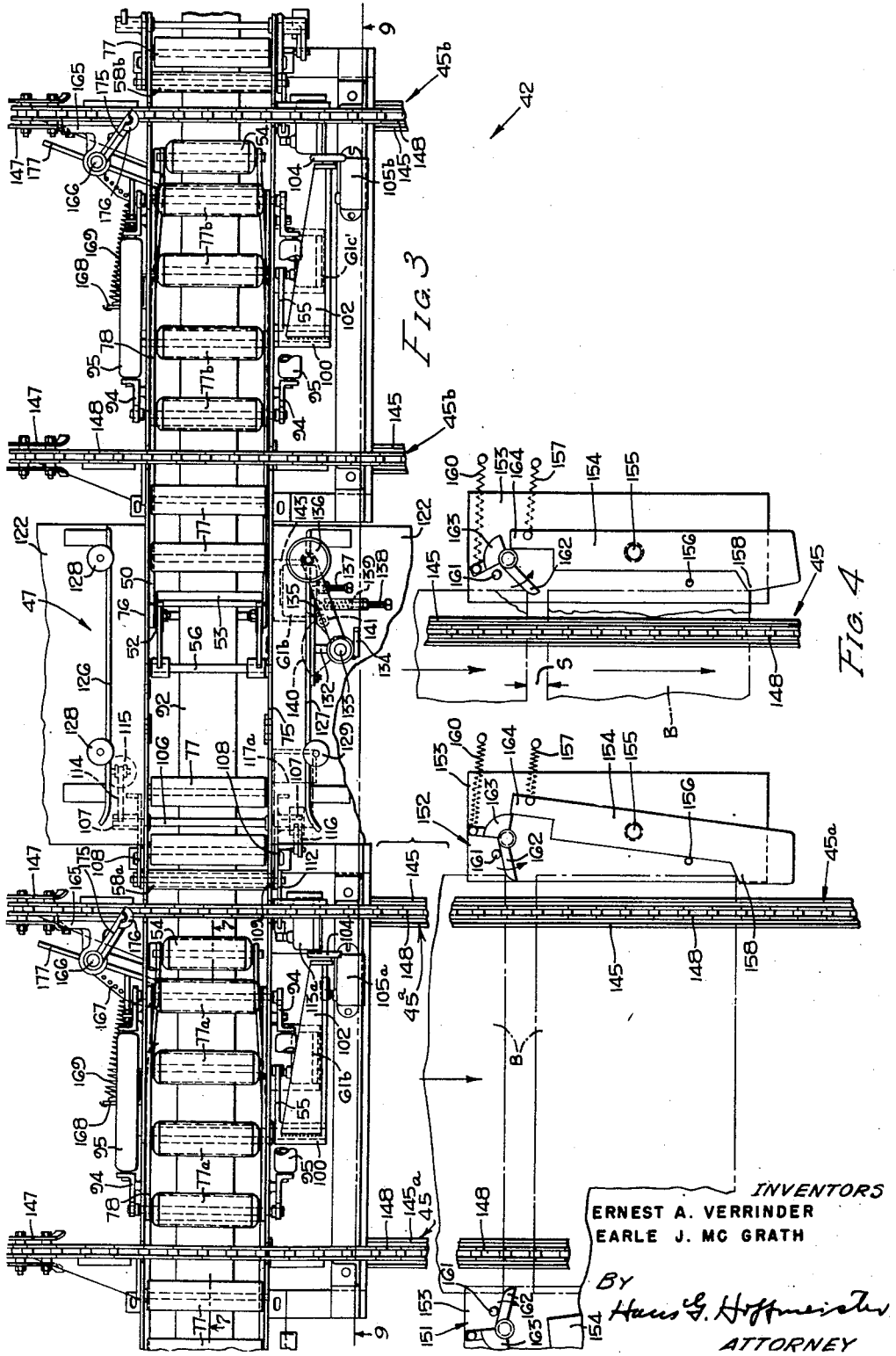

Nov. 19, 1957 E. A. VERRINDER ET AL 2,813,639
BOX SEGREGATOR
Original Filed Dec. 17, 1949 7 Sheets-Sheet 3

INVENTORS
ERNEST A. VERRINDER
EARLE J. MC GRATH

BY
ATTORNEY

Nov. 19, 1957  E. A. VERRINDER ET AL  2,813,639
BOX SEGREGATOR
Original Filed Dec. 17, 1949   7 Sheets-Sheet 4
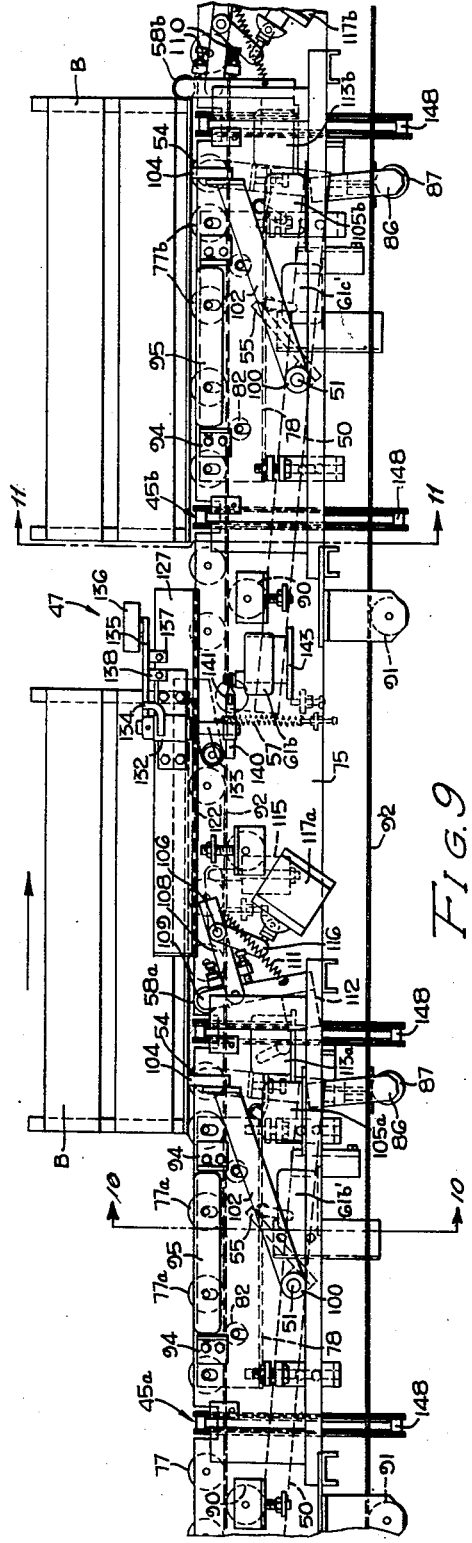
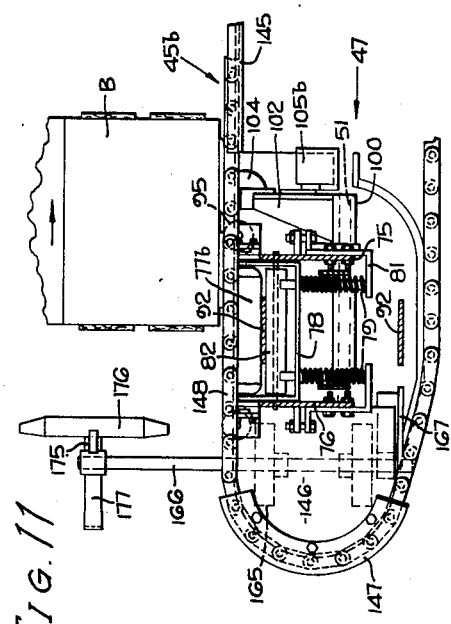
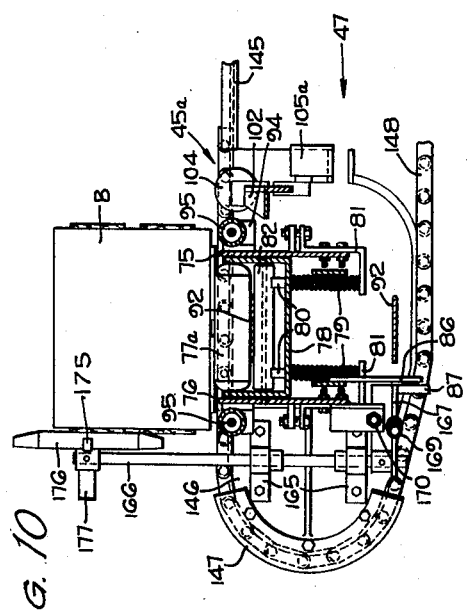
INVENTORS
ERNEST A. VERRINDER
EARLE J. MC GRATH
BY Hans G. Hoffmeister
ATTORNEY Nov. 19, 1957    E. A. VERRINDER ET AL    2,813,639
BOX SEGREGATOR
Original Filed Dec. 17, 1949    7 Sheets-Sheet 5
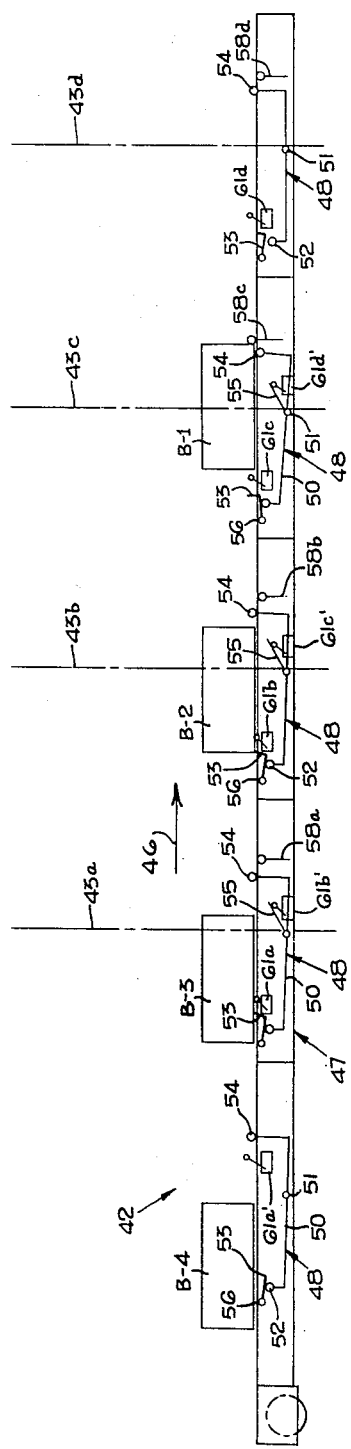
INVENTORS
ERNEST A. VERRINDER
EARLE J. MC GRATH
BY
Hans G. Hoffmeister.
ATTORNEY Nov. 19, 1957  E. A. VERRINDER ET AL  2,813,639
BOX SEGREGATOR
Original Filed Dec. 17, 1949  7 Sheets-Sheet 6
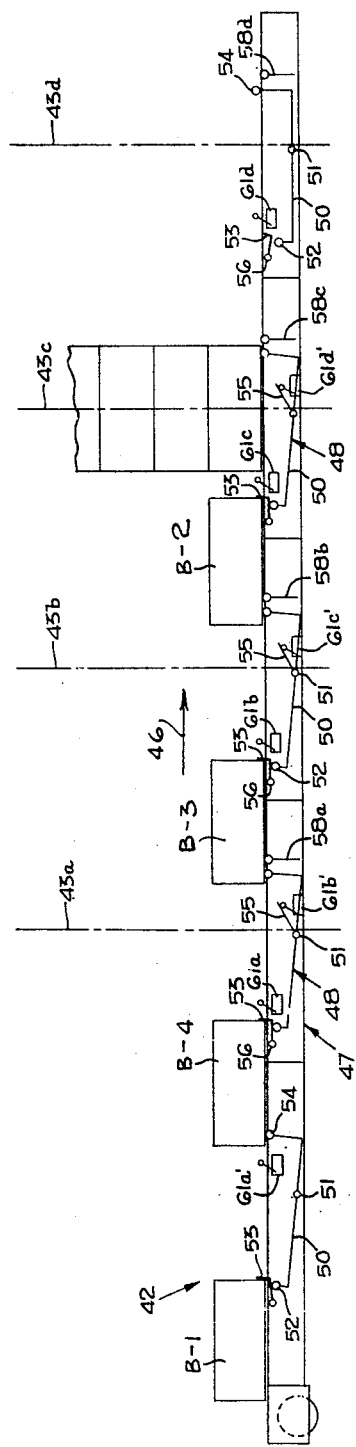
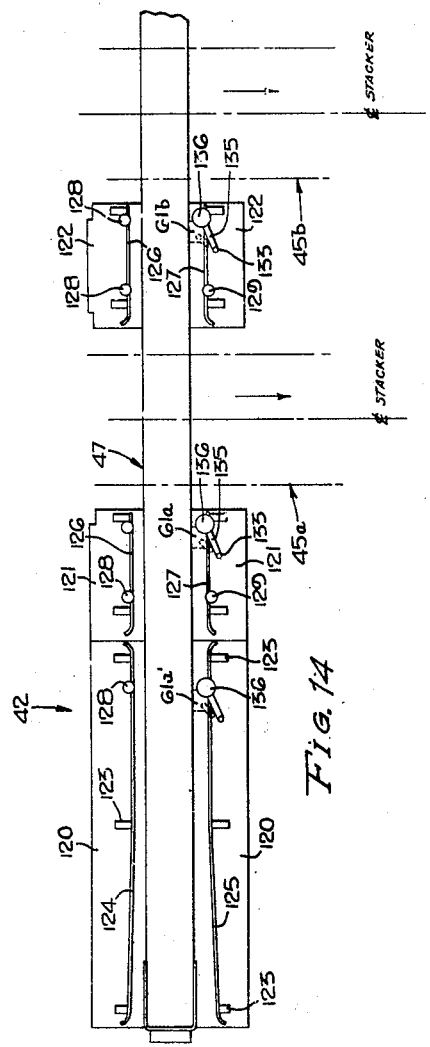
INVENTORS
ERNEST A. VERRINDER
EARLE J. MC GRATH
BY
Hans G. Hoffmeister
ATTORNEY

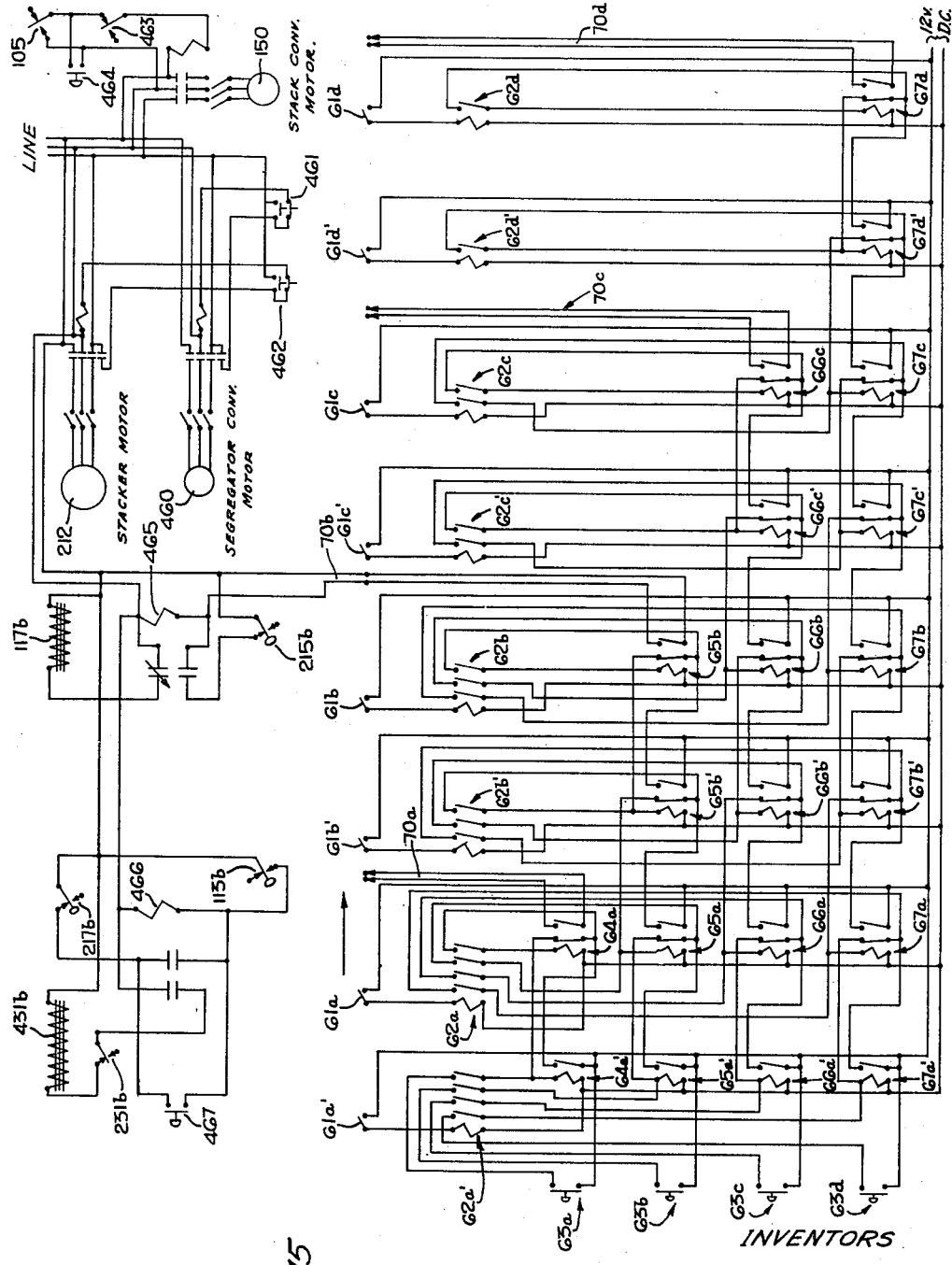

United States Patent Office 2,813,639
Patented Nov. 19, 1957

2,813,639
BOX SEGREGATOR

Ernest A. Verrinder, Riverside, and Earle J. McGrath, Nuevo, Calif., assignors to Food Machinery and Chemical Corporation, San Jose, Calif., a corporation of Delaware Original application December 17, 1949, Serial No. 133,634, now Patent No. 2,687,813, dated August 31, 1954. Divided and this application June 11, 1952, Serial No. 292,818

7 Claims. (Cl. 214—11)

Our invention relates to the segregating of commodities, and is particularly useful in the segregating of boxed, cartoned or packaged commodities.

This application is a division of our copending application Serial No. 133,634, filed December 17, 1949, for Box Segregator and Stacker, now Patent 2,687,813.

While our invention is adaptable for use in various industries, it has special utility in the fresh fruit packing industry and accordingly will be illustrated herein by the disclosure of an embodiment designed for this use, as for example, the segregating of open boxes of a loose commodity, such as lemons.

In a lemon packing house after the lemons have been received from the field, they are first washed and are then hand sorted according to color into groups classified as dark green, light green, silver and tree-ripe. These four color groups are stored for varying periods of time until they are sufficiently ripe to market.

Since the boxes containing lemons of these different color groups come indiscriminately from the color grading and sorting tables, it is a primary object of this invention to provide a novel and improved box segregator suitable for use in the operation of automatically segregating the boxes containing lemons belonging to the different color groups so that the boxes of each color group are brought together.

Another object is to enable a checker identifying the color of the lemons in each box as it passes a checking point on a conveyor to accomplish this segregation of boxes when said boxes are indiscriminately mixed up and pass in single file along the segregator conveyor.

A further object is to provide a box segregator having a box segregating station for each color group.

A still further object is to provide a box segregator in which the checker upon identifying each box as it passes the checking point may set suitable control mechanism for determining to which segregating station each box is to be delivered.

A still further object is to provide a box segregator with box identity maintaining means operably responsive to each box as it traverses the segregator between its box checking or identifying point and its series of box segregating stations.

A still further object is to provide each segregating station of such box segregator with box removing means jointly and operably responsive to the box identity maintaining means of the segregator and to each box upon its arrival at its preselected segregating station.

The manner of accomplishing the foregoing objects, as well as further objects and advantages will be made manifest in the following description taken in connection with the accompanying drawings in which:

Fig. 1 is a diagrammatic perspective of the segregator and stacker of the invention.

Fig. 2 is a fragmentary diagrammatic end elevation of a portion of the stacker of Fig. 1, the view being taken in the direction indicated by arrows 2—2 of Fig. 1.

Fig. 3 is a fragmentary plan view of a portion of the segregator of the invention and illustrating the stack spacer thereof as associated with one of the stack discharge conveyors.

Fig. 4 is a similar view illustrating a different step in the operation of the stack spacer than that shown in Fig. 3.

Fig. 9 is a vertical sectional view taken on the line 9—9 of Fig. 3.

Fig. 10 is a vertical cross-sectional view taken on the line 10—10 of Fig. 9, and showing a single box supported on a depressible segregator conveyor section.

Fig. 11 is a view similar to Fig. 10 and illustrates a stack of boxes resting on a stack discharge conveyor so as to be discharged thereupon, said stack depressing said depressible conveyor section so long as it remains over the latter.

Figure 7:
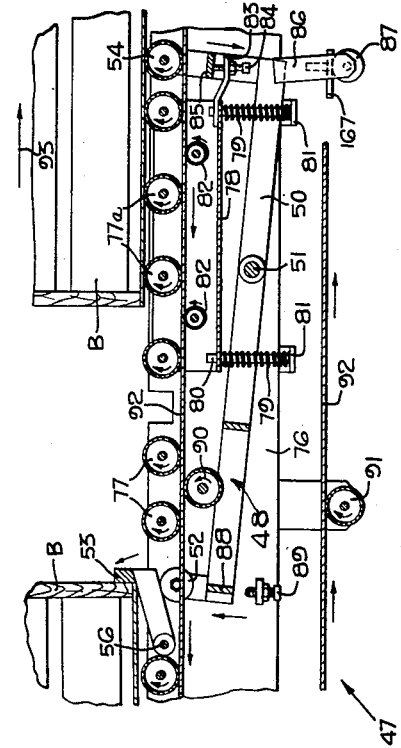
Fig. 7 is a diagrammatic longitudinal sectional view taken on line 7—7 of Fig. 3 and illustrating the aforesaid stop control when the latter is inactive as shown in Fig. 5.

Fig. 12 is a diagrammatic side elevational view of the segregator conveyor of the invention which illustrates the box stop system thereof and the location relative thereto of the box responsive switches for the memory system of said segregator, and illustrates a series of boxes traveling on the segregator conveyor of the invention with said boxes spaced apart uniformly a greater distance than the length of a box, as is normal in the operation of the invention where travel of boxes on said conveyor is not interrupted by the process of completing a stack in one of the stackers and discharging said stack from said stacker as illustrated in Fig. 13.

Fig. 13 is a view similar to Fig. 12 and shows a series of boxes halted on said conveyor by said stop system to maintain said boxes in spaced relation where the foremost of said boxes comprises the last box to be added to a stack in one of the stackers so as to necessitate holding up conveyor traffic through this stacker until said stack has been discharged therefrom.

Fig. 14 is a fragmentary diagrammatic plan view of the segregator conveyor of the invention illustrating the manner of mounting certain of the box responsive limit switches of the memory system of the segregator of the invention.

Fig. 15 is a wiring diagram of the electrical memory device of the segregator and includes a wiring diagram of one of the stackers of the invention.

Referring specifically to the drawings and particularly to Fig. 1, the present invention is seen to embody a combined box segregator and stacker 40 which includes a box accumulator 41, a box segregator 42 (the latter having a series of box diverting stations 43) a series of box stackers 44, one of which is associated with each of said stations, and a series of stack discharge conveyors 45, one of which is also associated with each of said stations. Each stacker 44 includes an elevator 49 (Fig. 2) which is arranged to lift boxes from a conveyor 47 as they are advanced through the machine. The entire machine is completely disclosed in our copending parent application which has issued as Patent No. 2,687,813. Accordingly, said patent may be referred to if necessary for a detailed disclosure of the structure.

The segregator

For illustrative purposes, the description herein of the invention shows the same as including four stations 43 in the segregator 42 with each of these stations equipped with a stacker 44 and stack discharge conveyor 45. It is to be understood, however, that following the principles illustrated in this disclosure, the invention may utilize a lesser or considerably larger number of stations 43.

It is already apparent that each of the stations 43 has associated therewith a considerable amount of apparatus, some of which is duplicated for each of the other stations. It will be necessary to first describe the structure and thereafter the operation of such duplicated apparatus. In referring to any element, thus duplicated, for the purpose of describing its structure or when making a general reference to it, a reference numeral will be employed.

To distinguish stations 43 from each other and to distinguish those duplicated elements of the apparatus, which are associated with each one of the stations 43, each of these stations will be distinguished by use of the reference numeral 43 with the addition of one of the letters $a$, $b$, $c$, or $d$ as a suffix. In a similar manner, the reference numeral for a duplicated element associated with a particular one of said stations will carry the same suffix letter as is used to distinguish that station from the others.

It is thus to be understood that where any reference numeral with suffix letter added is used in the drawings or description of the invention, the suffix letter merely distinguishes the element of the apparatus to which this reference numeral is applied as being associated with a particular one of the segregator stations 43. Suffix letters have been thus employed in the drawings, however, only in connection with reference numerals applied to apparatus elements which must be distinguished from other like elements in order to illustrate the description of the operation which follows the structural description of the invention. In all other cases on the drawings, the elements of the apparatus are identified merely by the reference numerals employed in structurally describing the same.

The accumulator 41 is shown diagrammatically in Fig. 1 of the drawings and may be any power driven conveyor which will propel boxes in single file in the direction of the arrow 46. Boxes are thus delivered from the accumulator 41 onto the conveyor 47 embodied in the segregator 42, this conveyor traveling at twice the rate of the accumulator 41 so that the boxes traveling on the conveyor 47 are always spaced more than a full box length apart.

In the operation of the invention, it is necessary that the boxes traveling on the conveyor 47 not only be initially spaced from each other as above indicated a distance greater than the length of a box, but that this spacing between the boxes be maintained throughout the operation of the device. This could be effected merely by the initial spacing of the boxes if it were not necessary in the present invention to interrupt the traffic of boxes along the conveyor 47 whenever a stack is being completed and discharged from one of the stackers 44.

To keep the boxes properly spaced as aforesaid during such an interruption of traffic, the conveyor 47 is provided with a series of uniformly spaced stop devices 48. As shown in Figs. 12 and 13, one of these devices is associated with each of the stations 43 and at least one additional device 48 is provided in advance of the initial station 43.

Each of the devices 48 includes a stop rocker 50 which is mounted on a shaft 51, this rocker having rollers 52 at its rear end for controlling a stop 53, and a roller 54 at its front end which, when depressed by a box passing thereover, rocks the rocker 50 to raise its stop 53 in the path of a following box. The shaft 51 of each of the devices 48, excepting the first and last such devices on the conveyor 47, has a short switch actuating arm 55. Each of the stops 53 is rockably mounted on a shaft 56 and is yieldably held down against its rollers 52 by a coil spring 57 (Fig. 9) so that said stop remains out of the path of boxes traveling on the conveyor 47 except when it is lifted by a box depressing the roller 54 of that device.

The conveyor 47 is also provided with a series of box stops 58, one of which is disposed at the far end of each of the box removing stations 43. The manner of actuating the stops 58 will be made clear hereinafter, it being sufficient for the present to note that they are employed to halt each box traveling on the conveyor 47 at one or the other of the stations 43 for the purpose of effecting the removal of this box from the conveyor by the stacker at said station, and the adding of it to a stack being formed by said stacker.

Fig. 12 shows a series of four boxes as these are normally spaced on the conveyor 47 when there is no interruption of the box traffic thereon as by a stack being completed in and discharged from a stacker. The first of these boxes, which may be identified as B–1, is halted by the stop 58$c$ and the other boxes B–2, B–3, and B–4 continue to travel in a rightward direction along the conveyor 47. As will later be pointed out in detail, the box stacker 44$c$ responds to the engagement of stop 58$c$ by box B–1 to rapidly lift this box from station 43$c$ and add it to a stack being formed in said stacker.

Fig. 13, as previously noted, illustrates the spacing of boxes by the stop devices 48 during an interruption of the box traffic on the conveyor 47 to permit the completion and discharge of a stack of boxes by the stacker 44$c$.

Segregator memory system

To facilitate control of the apparatus 40 by a single operator, the segregator 42 includes an electrical memory system 60 which is illustrated in Figs. 12, 13, 14, and 15. This system includes a series of eight limit switches 61 which are provided along the conveyor 47 at spaced intervals so that these will be actuated successively by a single box passing along the full length of the conveyor.

Alternate switches 61 are arranged to be actuated by the arms 55 of the devices 48 when the rollers 54 thereof are depressed by a box. The remainder of said limit switches 61 are arranged to be actuated by engagement with the front end and a sidewall of a box at points equally spaced along the conveyor between adjacent rollers 54.

To distinguish between the eight limit switches 61, that one of these which is located just in advance of each station 43, and upon the actuation of which by a particular box the system depends for stopping that box in that station, is designated by the numeral 61 plus the suffix letter distinguishing that particular station.

This group of four switches includes limit switches 61$a$, 61$b$, 61$c$, and 61$d$. Disposed just in advance of each of this group of limit switches, and designated by the numeral 61 and the same suffix letter with prime attached, is one of the other four limit switches 61 which are distinguished by the characters 61$a'$, 61$b'$, 61$c'$, and 61$d'$.

The system 60 also includes a bank of eight actuator relays 62, one of which is associated with each of the limit switches 61, and is distinguished from the other actuator relays by the numeral 62 plus the suffix letter employed to distinguish that particular limit switch.

There are also four push button selector switches 63, one for each station 43, which are distinguished from each other in the drawings by adding to numeral 63 the suffix letter distinguishing the station 43 to which a box is directed on conveyor 47 by closing that particular push button switch while said box is holding limit switch 61a' closed.

A bank of two lock-in relays 64a' and 64a is associated with push button switch 63a, these relays also being associated respectively with actuator relays 62a' and 62a.

A bank of four lock-in relays 65a', 65a, 65b', and 65b is associated with push button switch 63b, these lock-in relays also being associated respectively with actuator relays 62a', 62a, 62b', and 62b.

A bank of six lock-in relays 66a', 66a, 66b', 66b, 66c', and 66c is associated with push button switches 63c, these lock-in relays also being associated respectively with actuator relays 62 having corresponding suffix letters.

A bank of eight lock-in relays 67a', 67a, 67b', 67b, 67c', 67c, 67d', and 67d is associated with push button switches 63d, these lock-in relays also being associated respectively with actuator relays 62 having corresponding suffix letters.

Each of the lock-in relays with an a' suffix has a pair of normally open contacts only. Each of the other lock-in relays of the memory system 60 has a pair of normally open contacts and a pair of normally closed contacts.

Each of the actuator relays 62 has pairs of normally open contacts equal in number to the number of lock-in relays associated therewith.

Closing any of the limit switches 61 energizes the actuator relay 62 associated therewith to close all the contacts of the latter, which are all normally open. Each of these pairs of contacts is interposed in the coil circuit of one of the lock-in relays associated therewith and distinguished by the same suffix letter as said actuator relay.

Each of the push button switches 63 is also in the coil circuit of the lock-in relay having an a' suffix and associated therewith. The normally closed pair of contacts of each lock-in relay with an a suffix is in a holding circuit for the corresponding lock-in relay with an a' suffix. In a similar manner, the normally closed pair of contacts of each of the other lock-in relays is in a holding circuit for the lock-in relay immediately preceding it in the same bank, which circuit also includes the normally open pair of contacts of said last mentioned lock-in relay.

The normally open pair of contacts in each lock-in relay (except the last lock-in relay in each bank of these) is also in the coil circuit of the lock-in relay next following the same, which circuit also includes one of the normally open pair of contacts in the actuator relay 62 associated with said next following lock-in relay.

The normally open pair of contacts of the last lock-in relay of each bank, which lock-in relay is in each instance associated with one of the limit switches 61 depressed by a box arriving at one of the segregation stations 43, is included in a control circuit 70 of that stop 58 located at said station, and through the energizing of which circuit, said stop is caused to halt said box when it occupies said station.

The mode of operation of the memory system 60 will now be indicated by describing the sequence of functions thereof as box B-1 was caused to travel along the conveyor 47 to the station 43c and to be halted in said station by the stop 58c as shown in Fig. 12.

When box B-1 was delivered by the accumulator 41 onto the segregator conveyor 47, it traveled past the switch 61a' (which is at the checking point or post where the push button switches 63 are located). Noting that box B-1 contained fruit of a certain color, the boxes containing which are being stacked from station 43c, the checker closed the push button switch 63c while box B-1 was thus closing limit switch 61a'.

The simultaneous closing of switches 61a' and 63c energizes lock-in relay 66a' closing the open pair of contacts thereof, thereby readying lock-in relay 66a to be energized when box B-1 proceeds along the conveyor 47 to close limit switch 61a. The energizing of lock-in relay 66a breaks the holding circuit for lock-in relay 66a' causing this to be deenergized, and closes the normally open contacts of lock-in relay 66a readying lock-in relay 66b' to be energized when the box B-1 proceeds along the conveyor 47 so as to close limit switch 61b'.

Since the lock-in relay 66a is energized through the closed contacts of lock-in relay 66a', it is necessary that lock-in relay 66a' be held closed for a fraction of a second even though its coil circuit is broken by lock-in relay 66a being energized. This is accomplished in this instance, and elsewhere throughout the system, by using time delay release type relays for all lock-in relays.

The energizing of lock-in relay 66b' de-energizes lock-in relay 66a and readies lock-in relay 66b to be energized when the box closes limit switch 61b. In the same manner, lock-in relay 66c' is readied to be energized when the box B-1 closes limit switch 61c' and this in turn readies lock-in relay 66c to be energized when the box B-1 closes limit switch 61c. The energizing of lock-in relay 66c de-energizes lock-in relay 66c' and closes the stacker control circuit 70c which, in a manner to be made clear hereinafter, elevates stop 58c to halt box B-1 in segregator station 43c as shown in Fig. 12.

It is to be noted that at the moment box B-1 engages stop 58c, as shown in Fig. 12, the other boxes shown in this figure are following box B-1 in uniformly spaced succession. This relationship of the boxes traveling on the conveyor 47 is normal and continues to exist without interruption by one of these boxes being halted in a station 43 and being removed therefrom by the associated stacker excepting when the box so removed completes the stack being formed in said stacker, in which event the box traffic along conveyor 47 to or through that particular station is suspended until the stack being completed in that stacker is automatically lowered therein onto said station and discharged therefrom in a manner to be described later.

The diagram of Fig. 13 illustrates the manner in which the stop system of the segregator 42 temporarily halts boxes traveling on the conveyor 47 to enable the completion of a stack at station 43c and the discharge of this stack from over said station.

Upon the discharge of such a stack from station 43c, the roller 54 of said station which is shown as held down by said stack in Fig. 13, will be permitted to rise thereby causing stop 53 controlled by this roller to be withdrawn so that box B-2 will thus be free to resume its travel along the conveyor 47 in the direction of the arrow 46. Obviously, this successively frees boxes B-3 and B-4 and permits them to resume their travel along the conveyor with all of the boxes spaced approximately as illustrated in Fig. 12.

After box B-1 had moved opposite the checker and the checker had predetermined (by closing the push button switch 63c while this box was closing limit switch 61a') that it would ultimately be halted at station 43c on the segregator conveyor 47, the other boxes B-2, B-3, and B-4 successively engage and close the limit switch 61a', and, in each instance, the checker presses one of the push button switches 63 to likewise determine the destination of that particular one of these boxes on the segregator conveyor 47.

Having described the general organization of the segregator and stacker 40, and the electrical memory system 60 by which boxes fed into the invention may have their destination pre-selected at a checker's stand in advance of the stackers so that each box will proceed along the segregator to the stacker designated to receive it and be automatically halted for removal from the segregator by that stacker, we will now proceed to a detailed description of the structure of the segregator 42, stackers 44, and stack discharge floor tracks 45.

Segregator conveyor

The conveyor 47, as shown in Figs. 3, 7, 8, 9, 10, and 11, has a frame comprising a pair of deep rigidly spaced side plates 75 and 76. Rotatably mounted on upper portions of the plates 75 and 76 is a series of freely rotatable conveyor rollers 77. Within the areas of the stations 43, the rollers 77 are distinguished from others of these rollers by adding the suffix letter to the numeral 77 which distinguishes that particular station 43 from the others. The rollers 77 in each of these stations are mounted on the sidewalls of a U-shape sheet metal cradle 78 which is yieldably supported on springs 79 and guided by pins 80, the latter being fixed on brackets 81 which are secured to the outer faces of the frame plates 75 and 76 so as to be vertically adjustable. Each cradle 78 is also provided with a pair of idle belt supporting rollers 82. Extending from the right end of each of the cradles 78 (Figs. 7 and 8) is an arm 83 carrying an adjustable stop 84.

Figure 8:
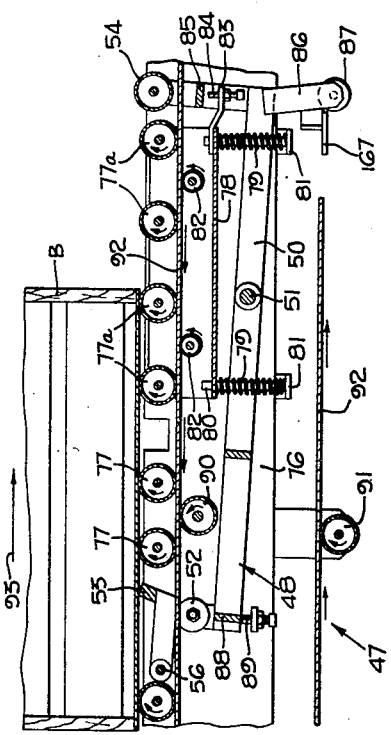
Fig. 8 is a view similar to Fig. 7 and illustrates said control when it is box actuated to retain said stop in box stopping position, as shown in Fig. 6.

As shown in Figs. 7 and 8, one of the stop actuating rockers 50 is associated with each of the stations 43 and each such rocker has a cross bar 85 located just below its roller 54 which is adapted to engage the adjustable stop 84 when the roller 54 is depressed to the same level as an adjacent roller 77. Also provided on the right end of each such rocker 50 is a downwardly extending arm 86, the lower end of which carries a roller 87.

At its other end each rocker 50 is provided with a cross bar 88 which normally engages an adjustable stop 89 provided on the conveyor side plates 75 and 76.

Also supported between and below the plates 75 and 76 are upper and lower idle rollers 90 and 91 which carry the upper and lower flights respectively of an endless belt 92 which is trained about suitable drive and driven rollers which are supported upon the frame plates 75 and 76 at the opposite ends of these. Idle rollers 82 assist the rollers 90 in holding the upper flight of belt 92 against the rollers 77 to frictionally rotate the latter so as to propel any of the boxes B resting on such rollers along the conveyor 47 in the direction of the arrow 93 (Figs. 7 and 8) when any such box is not halted by interposing a stop in front of it.

Mounted on brackets 94 (Figs. 3 and 9) fixed to the outer faces of the frame plates 75 and 76 near their upper edges are freely rotatable rollers 95. A pair of these rollers are thus provided symmetrically with each station 43.

Each of the rocker shafts 51 (Figs. 7, 8 and 9) extends outwardly in front of the frame plate 75 and has fixed thereon a hub 100 which, in all but the first and last stop devices 48, carries short arm 55, previously mentioned. In all except the first of the devices 48, said hub 100 also carries a long arm 102. The short arm 55 is positioned to actuate an adjacent one of the switches 61 upon depression of the roller 54 of the stop rocker fixed on this shaft down to the general level of the segregator conveyor rollers 77, and the arm 102 carries a roller 104 at its upper end which is on the same level as the roller 54 of said rocker. The arm 102 is positioned to also engage and actuate a switch 105 when the shaft 51 is rotated by the depression of the said roller 54 or said roller 104 below the level in which it is shown in Fig. 9 for a purpose which will be made manifest hereinafter.

Journalled in suitable bearings provided on plates 75 and 76 (Figs. 3 and 9) just to the right of each station 43 is a shaft 106 having collars 107 fixed on its outer ends, these carrying arms 108, on the left ends of which are pivotally mounted roller supporting uprights 109 between the upper ends of which one of the stop rollers 58 is pivotally mounted.

The arms 108 (Fig. 9) are provided with adjustable stops 110 to limit the rotation of the uprights 109 relative to said arms, and springs 111 are strung between lower portions of the uprights 109 and reverse ends of the arms 108 to normally hold the uprights 109 rocked against the lower pair of the adjustable stops 110.

Secured upon the lower end of one of the uprights 109 and extending leftward therefrom is a switch engaging lug 112 which is adapted for the actuation of a switch 113 under circumstances to be pointed out hereinafter.

Provided on one of the collars 107 is a horizontal arm 114 (Fig. 3) carrying a counterweight 115 which is of sufficient size to lift stop 58 supported on these hubs whenever said stop is freed from downward restraint. The other collar 107 has an arm 116 extending downwardly therefrom as shown in Fig. 9, the lower end of this arm being linked to a solenoid 117 which is mounted on the front face of the frame wall 75.

As shown in Fig. 14, the conveyor 47 has a pair of floor plates 120 which are disposed on the level of the upper edges of the conveyor side plates 75 and 76 and are suitably secured to said side plates and extend outwardly therefrom, the plates 120 being flush with the building floor in which the apparatus 40 is installed. The plates 120 are disposed alongside the initial portion of the conveyor 47 and somewhat shorter pairs of plates 121 provide extensions of the plates 120 between the latter and the initial segregator conveyor station 43a. Conveyor 47 is also provided with similar short floor plate sections 122, a pair of which are provided alongside said conveyor between each adjacent pair of stations 43.

Secured as by bolts to the plates 120 are brackets 123 of box guides 124 and 125. Secured in a similar manner on the plates 121 and 122 are similar though shorter box guides 126 and 127.

The guides 124 and 126 are provided with fixed idle box guiding rollers 128. Similar fixed box guiding rollers 129 are provided on box guides 127.

Box guides 125 and 127 provide mounts for bearings 132 (Figs. 3 and 9) in which vertical shafts 133 journal, there being a stop 134 provided on each bearing 132 which limits the outward swinging of an arm 135 which is fixed upon the upper end of shaft 133, this arm carrying a box engaging roller 136, an adjustable stop 137, and an adjustable spring mount 138, the latter being connected by a spring 139 to a lug provided on the bearing 132. The spring 139 yieldably holds the stop 137 against the adjacent box guide plate on which the bearing 132 is mounted with the roller 136 extending over said guide plate into the path of boxes traveling along the conveyor 47.

Fixed on the lower end of each shaft 133 is a switch actuating cam 140 which lies in the same horizontal plane with an actuating roller 141 of one of the 61 series of limit switches. The specific members of this group which are thus actuated by a box contacting one of the rollers 136 are switches 61a', 61a, 61b, 61c, and 61d, each of which is mounted on a plate 143 welded onto the front face of the conveyor frame plate 75. Of these switches, switch 61b and the means above described for operating the same is illustrated in Figs. 3 and 9.

Stack conveyor

Each of the stack conveyors 45 (stack conveyors 45a and 45b being shown in Figs. 3 and 9) includes a pair of track channels 145 which are aligned with the upper edges of plates 146 (Figs. 10 and 11) secured upon the rear face of the frame plate 76. The plates 146 have arcuate guides 147 so that endless floor chains 148 may be trained about the plates 146 with their upper flights traveling in the channels 145 and extending a slight distance above the upper edges of these channels. The opposite loops of the endless floor chains 148 are trained about a pair of drive sprockets (not shown) which are mounted on the same shaft and driven by a suitable electric motor 150 (shown only diagrammatically in Fig. 15). As shown in Fig. 9, the uppermost surfaces of the upper flights of the endless chain 148 travel at a level just beneath the level of the bottom of a box normally traveling along the conveyor 47.

*Stack spacer*

The conveyor 47 is installed in a pit so that the track channels 145 rest on the floor of the building containing the segregator and stacker 40. Mounted on this floor (as shown in Figs. 3 and 4) along opposite sides of each of the stack conveyors 45 is a pair of stack spacers 151 and 152 which are reverse duplicates of each other. Each of these devices includes a mounting plate 153 having a box holding lever 154 pivoted thereon at 155 and being yieldably urged against a stop 156 by a spring 157 so as to interpose a shoulder 158 adjacent said stop in the path of the lowermost box of a stack being carried on the adjacent stack conveyor 45.

Also pivotally mounted on the plate 153 and yieldably swung by a spring 160 against a stop 161 is a box responsive trigger 162 which normally extends into the path of a stack carried on the adjacent stack conveyor 45. Formed on the trigger 162 is a latch 163 which engages the shoulder 164 on the opposite end of the lever 154 from the shoulder 158 to normally hold the shoulder 158 rigidly extended into the path of a stack approaching on the stack conveyor 45.

Each pair of devices 151 and 152 are thus seen to hold the leading stack of boxes advancing along the associated stack conveyor 45, by the engagement of this stack with the shoulders 158 of the levers 154, until the next succeeding stack has moved to within a distance S (see Fig. 4) of the first stack, before the following stack has swung the trigger 162 to the point where the latch 163 has cleared the shoulder 164, thereby permitting the leading stack to resume travel by its frictional contact with the chains of said track conveyor, and with this stack spaced the distance S from the following stack.

Figure 6:
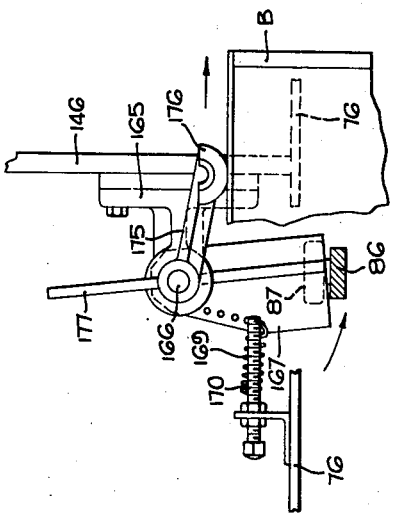
Fig. 6 is a view similar to Fig. 5 showing said control said control as when actuated by a box.
Figure 5:
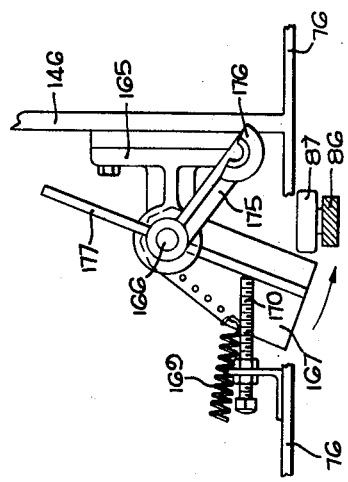
Fig. 5 is an enlarged detail view of a box responsive conveyor stop control in relaxed position.

Mounted upon the rightward plate 146 of each stack conveyor 45 (Figs. 3, 10 and 11) is a pair of bearings 165 in which a vertical shaft 166 journals. Fixed on the lower end of the shaft 166 is a flat segment 167. Strung between the segment 167 and a bracket 168 fixed on the frame plate 76 is a contractile coil spring 169 which yieldably swings the shaft 166 to bring a vertical web of the segment 167 into contact with an adjustable stop 170 (Fig. 5) mounted on the conveyor frame plate 76. Mounted on the upper end of the shaft 166 is an arm 175 with a vertical head 176 with a rounded box engaging face, this arm being engaged by each box passing the same traveling along the conveyor 47 so as to swing the shaft 166 and move the segment plate 167 over the roller 87 (Figs. 6 and 8) of the adjacent stop rocker 50 and thus hold this arm in lifting relation with the stop 53 associated therewith. Extending rearwardly from the hub of the arm 175 is an arm 177, the purpose of which will be made clear hereinafter.

The segregator conveyor belt 92 is constantly driven by a motor 460 (Fig. 15) which is started and stopped manually by a switch 461. The stacker motors 212 also run continuously and are manually started and stopped by a switch 462.

The switch control circuit for the motor 150 of each stack discharge conveyor 45 includes a safety switch 463 which is located at the end of that conveyor for the purpose of preventing the operation of the latter when to do so would deliver a stack over the end of the conveyor. Each such circuit also includes a jog switch 464.

The wiring diagram of Fig. 15 is fragmentary in that it only shows the wiring circuit of stacker 44b and the solenoid 117b which actuates stop 58b for halting a box in station 43b to be stacked by stacker 44b. It is to be understood, however, that the wiring system of the invention includes similar provision for each of the stackers 44 and associated elements and that the stopping of a box in any station 43 and the stacking of that box in the associated stacker is initiated and follows in a fully automatic series of operations upon the closing of the corresponding control circuit 70 for that station, each of these circuits being identified in Fig. 15 by the numeral 70 with the suffix letter added thereto identifying it with its station.

*Operation*

The manner in which boxes B are fed along the segregator conveyor 47 in controlled spaced relation in the delivery of each box to a predetermined station 43 selected by operation of one of the push button switches 63 at a checking station in advance of the first of the stackers, has been previously described.

It was there pointed out how the closing of one of the switches 61 by each such box as it is about to enter the station of its destination effected the closing of the control circuit 70 of that station. Assuming, for example, that a box destined for station 43b has just actuated switch 61b, thereby closing circuit 70b, the resulting stopping of this box in this station and the stacking of the same will now be described.

Referring to Fig. 15, it is noted that circuit 70b includes a magnetic switch 465 having normally closed contacts in the circuit of solenoid 117b so that the latter is normally continuously energized. The switch 465 also has normally open contacts which are included in a holding circuit for this switch, this circuit also including switch 215b which is normally closed.

The closing of circuit 70b by a box B closing switch 61b as aforesaid is thus seen to energize the switch 465 thereby setting up a holding circuit for the switch and de-energizing the solenoid 117b. The effect of this is to release the stop 58b from the restraint of the solenoid 117b permitting the counter-weight 115 for this stop to elevate the latter into the path of the advancing box so as to halt said box within the confines of station 43b in which it is thus in position to be elevated in the stacker 44b in the process of forming a stack therein.

Engagement of the box B with stop 58b rocks the uprights 109 supporting this stop about their pivotal connections with the arms 108, thereby swinging the lug 112 of this stop into actuating relation with switch 113b (see Figs. 9 and 13). The latter switch is normally open and when closed energizes magnetic switch 466 which has two normally open pairs of contacts, one of which is in the circuit of valve solenoid 431b and which also includes normally closed safety switch 231b, the other pair of contacts being in a holding circuit for the switch 466 which also includes normally closed switch 217b.

The coil circuit for the switch 466 also has a normally open switch 467 by which said circuit may be manually closed at will.

The closing of switch 113b by box B engaging and shifting stop 58b thus energizes that part of the control mechanism which causes the elevator 49 (Fig. 2) of the stacker 44 to successively form stacks of boxes in the stacker and causes the stacks to be discharged from the stacker. The operation of the complete machine and its control circuit is fully disclosed in our above-mentioned Patent No. 2,687,813.

High among the advantages of the present invention are the elimination of the back-breaking labor of lifting open boxes of fruit to form fairly high stacks of these as required in the lemon packing industry, and the automatic segregation and stacking of these boxes according to color under the control of a single operator.

While the invention has been disclosed as adapted for use in the lemon packing industry, it is, of course, widely applicable to other uses as previously noted herein. It should also be evident that the segregator 42 may be used independently of the stackers 44 and other means provided for lifting or otherwise removing boxes from the respective stations 43 of the segregator. As previously noted, the segregator, although disclosed to provide only four stations 43, may have a smaller or considerably larger number of these, the memory system 60 being readily expansible to accommodate any desired number of such stations.

Having thus described the invention what we claim as new and desire to protect by Letters Patent is:

1. In a box segregator, the combination of: means for conveying said boxes in single file and in spaced relation along a given path; a series of limit switches located at intervals slightly greater than the length of a box along said conveyor and in position to be engaged and actuated successively by a box traveling along said conveyor; a series of box group identifying push button switches; a bank of actuator relays, there being one such relay for each of said limit switches which relay is energized by the closing of said limit switch, there being a series of box removal stations disposed at intervals along said conveyor and corresponding respectively to said push button switches; a series of banks of lock-in relays, one bank for each push button switch, said bank including a lock-in relay for each of the limit switches actuated by a box traveling along said conveyor to the station thereon corresponding to said push button switch, each of said actuator relays having normally open contacts in the coil circuit of a corresponding lock-in relay (where there is one) in each of said banks of lock-in relays, each of said push button switches being in the coil circuit of the initial lock-in relay in the corresponding bank of lock-in relays, each of said lock-in relays except the final one in each bank having normally open contacts in the coil circuit of the next interlocking relay in the same bank, each of the interlocking relays in each bank thereof, except the initial interlocking relay, having normally closed contacts in a holding circuit for the interlocking relay immediately preceding it in the same bank, the final interlocking relay in each bank having normally open contacts in a circuit automatically operative, upon the arrival of a box at the station in which said box closes the limit switch which effects the energizing of said final interlocking relay to identify said box with a group of boxes to be removed from said conveyor at said station.

2. A combination as in claim 1 in which a stop is provided at each of said stations to halt a box therein, each of said stops being automatically moved into operative position by the energizing of the final interlocking relay for that station.

3. A combination as in claim 1 in which means is provided at each of said stations for removing a box from said stations, and in which the energizing of the final interlocking relay associated with any such station by a box arriving at said station automatically renders said box removing means for said station operative to remove said box from said station.

4. In an article segregator, the combination of a conveyor arranged to move an article along a predetermined path, a plurality of stop members disposed at spaced points along said path and mounted for movement from a position removed from the path of an article to a position disposed in the path of the article, a solenoid-controlled linkage operatively connected to each stop member, each stop member being arranged to be moved to article-arresting position when the associated solenoid is energized, a control circuit for each solenoid, a plurality of relays in each circuit arranged to be successively energized and to actuate the stop member in the circuit when the last relay in the circuit is energized, a selector switch in each circuit in series with the relays therein and arranged upon being moved to closed position to partially close the circuit and ready the circuit for complete closing by said relays, and a plurality of switches disposed in spaced relation adjacent said conveyor in position to be successively actuated by an article being advanced on said conveyor, each switch being associated with one of said relays and arranged to energize the relay upon being moved to closed position by the article on said conveyor, whereby each circuit readied by closure of the associated selector switch will be progressively closed as the article is advanced along the conveyor toward the associated stop member.

5. In an article segregator the combination of conveying means for moving articles over a fixed path, a plurality of stop members disposed at spaced points along said path and mounted for movement from a position removed from the path of an article to a position disposed in the path of an article, a plurality of electrical control circuits, one circuit being operatively connected to each stop member and each stop member being movable to article-arresting position when the associated control circuit is energized, an initial relay having a set of open contacts in each control circuit, a first switch disposed adjacent said conveyor and arranged to be moved to closed position by a box being advanced on said conveyor, said first switch being electrically connected in the circuit of said initial relay and being arranged upon being moved to closed position to energize said relay whereby to close said sets of open contacts, a manually actuated selector switch connected in each control circuit in series with the set of open relay contacts, the closing of a selected one of said selector switches being effective to partially close the associated control circuit, and additional switches adjacent said conveyor and disposed on the downstream side of said first switch and arranged to be moved to closed position by a box on said conveyor, one of said additional switches being connected in each control circuit and arranged upon being moved to closed position to close the circuit when the circuit has been partially closed by the associated selector switch.

6. In an article segregator, the combination of a conveyor arranged to move an article along a predetermined path, a plurality of stop members disposed at spaced points along said path and mounted for movement from a position removed from the path of an article to a position disposed in the path of the article, a solenoid-controlled linkage operatively connected to each stop member, each stop member being arranged to be moved to article-arresting position when the associated solenoid is energized, a control circuit for each solenoid, a selector switch in the control circuit of each solenoid and arranged to partially close the circuit upon being moved to closed position, a plurality of relays, each relay having a set of open contacts in the control circuit of the solenoid controlling a particular stop member and a set of open contacts in the control circuit of each solenoid that is operatively connected to a stop member on the downstream side of said particular stop member, an energizing circuit for each relay arranged when energized to close all of the sets of open contacts of the relay, a plurality of normally open switches disposed in spaced relation adjacent said conveyor and arranged to be moved to closed position by an article moving along said conveyor, each normally open switch being connected in the energizing circuit of one of said relays and being disposed on the upstream side of the particular stop member associated with said one relay, and means for actuating said conveyor to move an article along said path and over said normally open switches to successively close each switch and close the energizing circuit of the associated relay, whereby to close the contacts of each relay and complete the closing of each circuit having a selector switch in closed position.

7. An article segregator comprising a conveyor arranged to move articles along a predetermined path, a plurality of stop members disposed in spaced relation along said conveyor, an electrically-actuated control mechanism operatively connected to each stop member for controlling the position of said stop member, and an electric circuit for each control mechanism including a selectively-operable switch arranged to partially close the circuit and a plurality of normally open switches disposed adjacent the conveyor and arranged to be successively contacted and moved to closed position by a box being advanced on said conveyor to complete the closing of the circuit.

References Cited in the file of this patent

UNITED STATES PATENTS

| | | |
|---|---|---|
| 1,937,303 | Worrall | Nov. 28, 1933 |
| 1,992,686 | Anderson | Feb. 26, 1935 |
| 2,227,778 | Fischbach et al. | Jan. 7, 1941 |
| 2,230,279 | Wilcox | Feb. 4, 1941 |
| 2,362,079 | McCann et al. | Nov. 7, 1944 |
| 2,610,748 | Larham | Sept. 16, 1952 |